United States Patent
Honda

(10) Patent No.: US 7,581,050 B2
(45) Date of Patent: Aug. 25, 2009

(54) INFORMATION PROCESSING APPARATUS, PERIPHERAL APPARATUS CONTROL METHOD, AND COMPUTER READABLE MEDIUM

(75) Inventor: Hideki Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 11/674,935

(22) Filed: Feb. 14, 2007

(65) Prior Publication Data

US 2007/0198755 A1    Aug. 23, 2007

(30) Foreign Application Priority Data

Feb. 20, 2006    (JP) .............................. 2006-077711

(51) Int. Cl.
*G06F 12/00* (2006.01)

(52) U.S. Cl. .................. 710/240; 710/19; 709/223; 709/224

(58) Field of Classification Search .................. 710/19, 710/240; 709/223, 224; 358/1.14, 1.15
See application file for complete search history.

(56) References Cited

U.S. PATENT DOCUMENTS

| | | | | |
|---|---|---|---|---|
| 5,220,674 A | * | 6/1993 | Morgan et al. | 709/223 |
| 5,247,623 A | * | 9/1993 | Sun | 710/106 |
| 5,537,626 A | * | 7/1996 | Kraslavsky et al. | 710/8 |
| 5,611,046 A | * | 3/1997 | Russell et al. | 358/1.16 |
| 5,613,160 A | * | 3/1997 | Kraslavsky et al. | 710/16 |
| 5,625,757 A | * | 4/1997 | Kageyama et al. | 358/1.14 |
| 5,652,839 A | * | 7/1997 | Giorgio et al. | 709/224 |
| 6,145,031 A | * | 11/2000 | Mastie et al. | 710/52 |
| 6,189,049 B1 | * | 2/2001 | Klein | 710/1 |
| 6,266,693 B1 | * | 7/2001 | Onaga | 709/219 |
| 6,301,012 B1 | * | 10/2001 | White et al. | 358/1.15 |
| 6,314,476 B1 | * | 11/2001 | Ohara | 710/15 |
| 6,490,052 B1 | * | 12/2002 | Yanagidaira | 358/1.15 |
| 6,681,349 B2 | * | 1/2004 | Sekizawa | 714/47 |
| 6,734,985 B1 | * | 5/2004 | Ochiai | 358/1.15 |
| 6,809,830 B1 | | 10/2004 | Lafky | |
| 6,879,408 B1 | * | 4/2005 | Hori et al. | 358/1.13 |
| 6,920,506 B2 | * | 7/2005 | Barnard et al. | 709/245 |
| 7,020,702 B2 | * | 3/2006 | Clark et al. | 709/224 |
| 7,180,626 B1 | * | 2/2007 | Gassho et al. | 358/1.6 |
| 7,185,119 B2 | | 2/2007 | Kim | |
| 2003/0103081 A1 | * | 6/2003 | Ebuchi | 345/764 |
| 2007/0198755 A1 | * | 8/2007 | Honda | 710/36 |

FOREIGN PATENT DOCUMENTS

| | | |
|---|---|---|
| JP | 2003-308194 A | 10/2003 |
| JP | 2004-096338 A | 3/2004 |
| KR | 2003-0080872 A | 10/2003 |

OTHER PUBLICATIONS

USB Implementers Forum. Universal Serial Bus Device Class Definition for Printing Devices. Version 1.1. Jan. 2000.*

(Continued)

*Primary Examiner*—Mark Rinehart
*Assistant Examiner*—Matthew D Spittle
(74) *Attorney, Agent, or Firm*—Canon U.S.A., Inc. I.P. Division

(57) ABSTRACT

The present invention provides a peripheral apparatus control method, and an information processing apparatus and control method that can correctly manage and display a status of each individual peripheral apparatus, even when a plurality of peripheral apparatuses is allocated to a single queue.

12 Claims, 18 Drawing Sheets

OTHER PUBLICATIONS

SMSC. High Performance ECP/EPP Printer Interface Using the PPC34C60 PPIC. Application Note 4.17. Jan. 13, 1994.*

Niceware International, LLC. Bidirectional Communication: The Backbone of the modern printing infrastructure. White Paper. 2008.*

* cited by examiner

F I G. 1
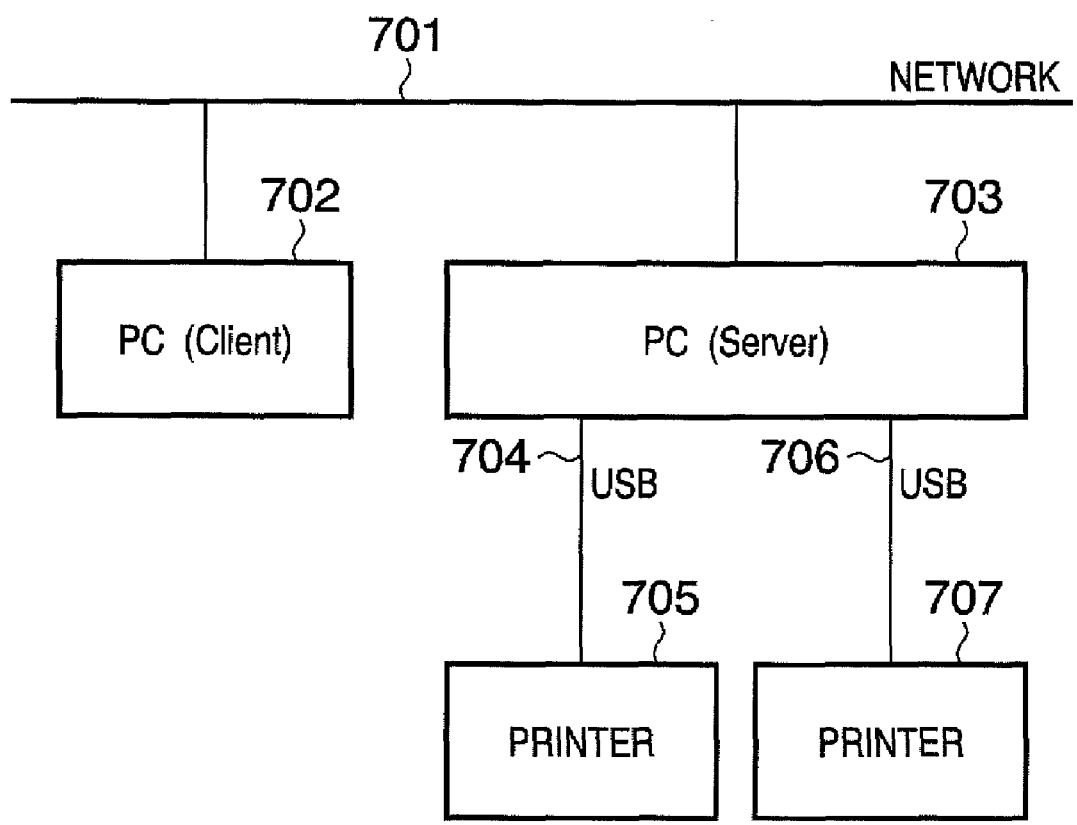

FIG. 7

|  | Printer ABC | | | |
|---|---|---|---|---|
|  | DOCUMENT NAME | STATUS | PAGE NO. | PORT |
| 102 — | REPORT.doc | PRINTING | 1 / 2 | USB001 |
| 103 — | INVITATION.doc | PRINTING | 1 / 1 | USB002 |

Definition : Status
Node Type : Value
Description :         PRINTER INFORMATION
Full Schema Path :    ¥ Printer.Information.<PortName> : Status
1101 — Data type : Binary

- DEVICE ID
- WARNING INFORMATION
- ERROR INFORMATION
- REMAINING INK
- PAGE BEING PRINTED
- PAGES PRINTED

FIG. 14

```
HKEY_LOCAL_MACHINE
    ¥SYSTEM
        ¥CurrentControlSet
            ¥Control
                ¥Print
                    ¥Printers
                        ¥Printer ABC
                            ¥PrinterDriverData
                                ¥USB001
                                ¥USB002
```

| NAME | TYPE | DATA |
|---|---|---|
| Printer_Status_Cartridge | REG_SZ | Color |
| Printer_Status_Error | REG_SZ | No |
| Printer_Status_Warning | REG_DWORD | 500 |
| Printer_Status_Ink_Color | REG_DWORD | 70 |

INFORMATION PROCESSING APPARATUS, PERIPHERAL APPARATUS CONTROL METHOD, AND COMPUTER READABLE MEDIUM

BACKGROUND OF THE INVENTION

1. Field of the Invention

The present invention relates to a peripheral apparatus control method, and an information processing apparatus and control method pertaining for example, a peripheral apparatus control method that controls peripheral apparatus such as a printer, and an information processing apparatus and control method pertaining thereto.

2. Description of the Related Art

A concept known as a "queue" has been adopted in operating systems such as Windows® 2000 or Windows® XP, as a management method of peripheral apparatuses such as an inkjet printer and a laser printer that are connected to an information processing apparatus such as a computer. The peripheral apparatus is allocated a queue, and an application running on Windows® 2000 or Windows® XP is able to perform printing on a desired peripheral apparatus by sending a print job to the queue.

The queue is also capable of registering a module known as a language monitor (LM), which performs communication with the peripheral apparatus. An application that displays the status of the peripheral apparatus, i.e., a status monitor, uses the LM, an operating system registry, or Printing and Print Spooler Interfaces to perform communication and display the status of the peripheral apparatus. A status obtainment technology is disclosed, for example, in Japanese Patent Application Laid Open No. 2003-308194. The Printing and Print Spooler Interfaces is a communications tool that is published by Microsoft Developer network (MSDN).

Under normal circumstances, one queue is allocated to one peripheral apparatus. However, Windows® 2000 and Windows® XP have a function known as a printer pool. Using the function, it is possible to allocate a plurality of peripheral apparatuses to a single queue. A print job sent to the queue is sent to one of a plurality of peripheral apparatuses. Thus, a plurality of print jobs sent to the queue can be simultaneously printed.

If the plurality of peripheral apparatuses is allocated to the single queue using the printer pool function, however, the status monitor cannot correctly monitor the status of the peripheral apparatus.

For example, when the status monitor and the LM use a registry that stores the status to perform communication, one registry area is allocated to the queue. The registry area is "HKEY_LOCAL_MACHINE¥SYSTEM¥CurrentControl Set¥Control¥Pr int¥Printers¥PrinterABC¥Printer Driver-Data". Accordingly, if information on a first peripheral apparatus that is stored in the registry is overwritten with information on a second peripheral apparatus, it is not possible to correctly monitor the peripheral apparatus status.

The Printing and Print Spooler Interfaces perform communication similarly, on a per queue basis, such as when the status monitor and the LM use the Printing and Print Spooler Interfaces to communicate. In such instance, the status monitor cannot specify the peripheral apparatus that it is monitoring when the plurality of peripheral apparatuses is allocated to the single queue. Consequently, it is not possible to correctly monitor the status of all peripheral apparatuses that are allocated to the queue, meaning that only the single peripheral apparatus can be monitored at all.

SUMMARY OF THE INVENTION

The present invention provides a peripheral apparatus control method, and an information processing apparatus and control method pertaining that can correctly manage and display a status of each individual peripheral apparatus, even when a plurality of peripheral apparatuses is allocated to a single queue.

According to an aspect of the present invention, an information processing apparatus is provided which is adapted to run an operating system, wherein the information processing apparatus is configured to allocate a plurality of peripheral apparatuses to a single queue that manages each of the plurality of peripheral apparatuses. The information processing apparatus including a status management unit configured to perform communication with the plurality of peripheral apparatuses, obtain the status of each respective peripheral apparatus on the basis of each individual port connected to the single queue, and store the statuses in a status storage unit; a status query unit configured to query the status management unit via a spooler of the operating system for the status of each respective peripheral apparatus; a port identifier recognition unit configured to recognize a port identifier that is contained within a status query message that is issued by the status query unit, and identify the respective port to which a respective peripheral apparatus is connected; and a status reply unit configured to read out the status of each respective peripheral apparatus which is connected to the respective port that corresponds to the respective port identifier recognized by the port identifier recognition unit, and reply the statuses to the status query unit.

According to another aspect of the present invention, an information processing apparatus is provided which is adapted to run an operating system, wherein the information processing apparatus is configured to write, to a registry which is allocated a per queue basis by the operating system, a status that is obtained from each one of a plurality of peripheral apparatuses, and allocate the plurality of peripheral apparatuses to a single queue that manages the plurality of peripheral apparatuses. The information processing apparatus includes a status management unit configured to communicate with any one of the peripheral apparatuses, match the status of each respective peripheral apparatus with a respective port identifier that corresponds to a respective one of the plurality of peripheral apparatuses, and record each respective status on a per port basis within the registry; and a status obtainment unit configured to designate the respective port identifier of each respective status of each respective peripheral apparatus, access the registry, and read out the statuses.

According to another aspect of the present invention, a peripheral apparatus control method is provided for an information processing apparatus which runs an operating system, wherein the information processing apparatus is configured to allocate a plurality of peripheral apparatuses to a single queue that manages the plurality of peripheral apparatuses. The method includes obtaining a status of each respective peripheral apparatus on the basis of each individual port connected to the single queue, and storing the statuses in a status storage unit; querying the status of each of the peripheral apparatuses via a spooler of the operating system; recognizing a port identifier that is contained within a status query message issued by the status query and which identifies each respective port to which the peripheral apparatuses are connected; and reading out the status of each respective peripheral apparatus, which is connected to the respective port that corresponds to the recognized port identifier, and replying the status.

According to yet another an aspect of the present invention, a peripheral apparatus control method is provided for an information processing apparatus adapted to run an operating system, wherein the information processing apparatus is configured to write, to a registry which is allocated a per queue basis by the operating system, a respective status that is obtained from each of a plurality of peripheral apparatuses, and allocate the plurality peripheral apparatuses to a single queue that manages the plurality of peripheral apparatuses. The method includes matching the status of each of the plurality of peripheral apparatuses with a respective port identifier, and recording the status on a per port basis within the registry; and obtaining the status of each of the plurality of peripheral apparatuses for designating the respective port identifier of the status of each of the peripheral apparatuses, accessing the registry, and reading out the statuses.

Moreover, according to still yet another aspect of the present invention, a computer readable medium is provided which contains computer-executable instructions for controlling an information processing apparatus which runs an operating system, wherein the information processing apparatus is configured to allocate a plurality of peripheral apparatuses to a single queue that manages the plurality of peripheral apparatuses. The medium includes computer-executable instructions for obtaining a status of each respective peripheral apparatus on the basis of each respective individual port connected to the single queue, and storing the statuses in a status storage unit; computer-executable instructions for querying the status of each of the peripheral apparatuses via a spooler of the operating system; computer-executable instructions for recognizing a port identifier that is contained within a status query message issued by the status query, and which identifies each respective port to which the peripheral apparatuses are connected; and computer-executable instructions for reading out the status of each respective peripheral apparatus, which is connected to the respective port that corresponds to the recognized port identifier, and replying the status.

And also, according to another aspect of the present invention, a computer readable medium is provided for containing computer-executable instructions for controlling an information processing apparatus adapted to run an operating system, wherein the information processing apparatus is configured to write, to a registry which is allocated a per queue basis by the operating system, a respective status that is obtained from each of a plurality of peripheral apparatuses, and allocate the plurality peripheral apparatuses to a single queue that manages the plurality of peripheral apparatuses. The medium includes computer-executable instructions for matching the status of each of the plurality of peripheral apparatuses with a respective port identifier, and recording the status on a per port basis within the registry; and computer-executable instructions for obtaining the status of each of the plurality of peripheral apparatuses for designating the respective port identifier of the status of each of the peripheral apparatuses, accessing the registry, and reading out the statuses.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram of a system that realizes a peripheral apparatus control system including an information processing apparatus and a peripheral apparatus according to the present embodiment in a network environment.

FIG. 7 shows an example of a queue when a plurality of peripheral apparatuses is allocated thereto, according to the present embodiment.

FIG. 11 shows a schema that a status monitor uses when requesting a status of a printer from a LM, according to the first embodiment.

FIG. 12 is a conceptual view showing a binary data example wherein the printer status obtained by the schema shown in FIG. 11 is stored.

FIG. 14 shows a printer status storage location within a registry, according to a second embodiment.

FIG. 15 shows an example of a printer status that is stored within the registry shown in FIG. 14.

DESCRIPTION OF THE EMBODIMENTS

A detailed description will be given of embodiments of the present invention with reference to the attached drawings. While the present embodiment described draw on an example of a personal computer (PC) controlling a plurality of printers that are connected thereto, the present embodiment is not limited to the example herein. For example, a peripheral apparatus need not be a printer; similar results are depicted even with different peripheral apparatuses, including but not limited to a copier, a fax machine, or a multi-function apparatus that may comprise functions including but not limited to the functions of a printer, a scanner, or a fax machine. Whereas a PC has been cited as an example of an information processing apparatus, the embodiments may also be fulfilled, and are similarly valid, with an arbitrary terminal that is capable of using similar methods, including but not limited to a DVD video player, an electronic game machine, a set-top box, or an Internet appliance. Such apparatuses are also subsumed within the present invention.

<Example of Constitution of a Peripheral Apparatus Control System According to the Present Embodiment>

FIG. 1 is a block diagram of a system that realizes a peripheral apparatus control system including an information processing apparatus and peripheral apparatus according to the present embodiment in a network environment.

In FIG. 1, Nos. 702 and 703 are information processing apparatuses, typically constituted of PCs. The PC 702 and the PC 703 are constituted of hardware such as that described in FIG. 3, and have an operating system, or OS, installed thereon, such as, for example, Microsoft Windows® XP. The type of OS is not limited thereto, however, with such other operating systems as, for example, Linux also being applicable. The explanation that follows, however, will draw upon the example of Microsoft Windows®. The PC 702 and the PC 703 are connected via a network 701 constituted with Ethernet, and are both capable of bi-directional communication. In the peripheral apparatus control system according to the present embodiment, the relationship is such that the PC 703 is a server, and the PC 702 is a client. In other words, the PC 703 has a print server function that is capable of printing from another information processing apparatus, via the network 701, to a printer 705 and a printer 707, as a shared printer.

Figure 2A:
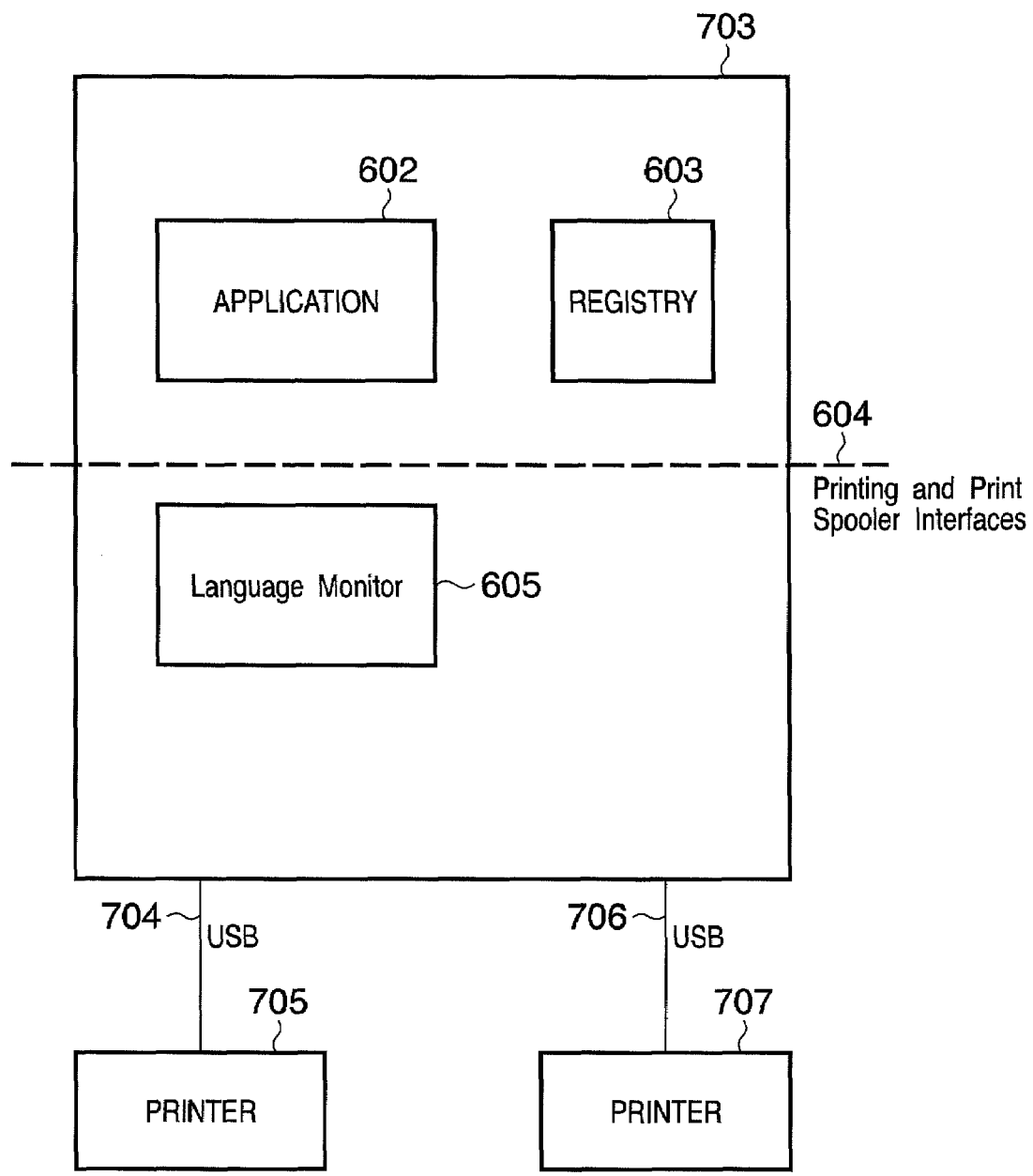
FIG. 2A is a block diagram of a peripheral apparatus control system including an information processing apparatus and a peripheral apparatus according to the present embodiment.

FIG. 2A is a block diagram of the peripheral apparatus control system including the information processing apparatus and the peripheral apparatus according to the present embodiment. Elements in FIG. 2A that correspond to elements in FIG. 1 are labeled with identical reference numbers.

Figure 3:
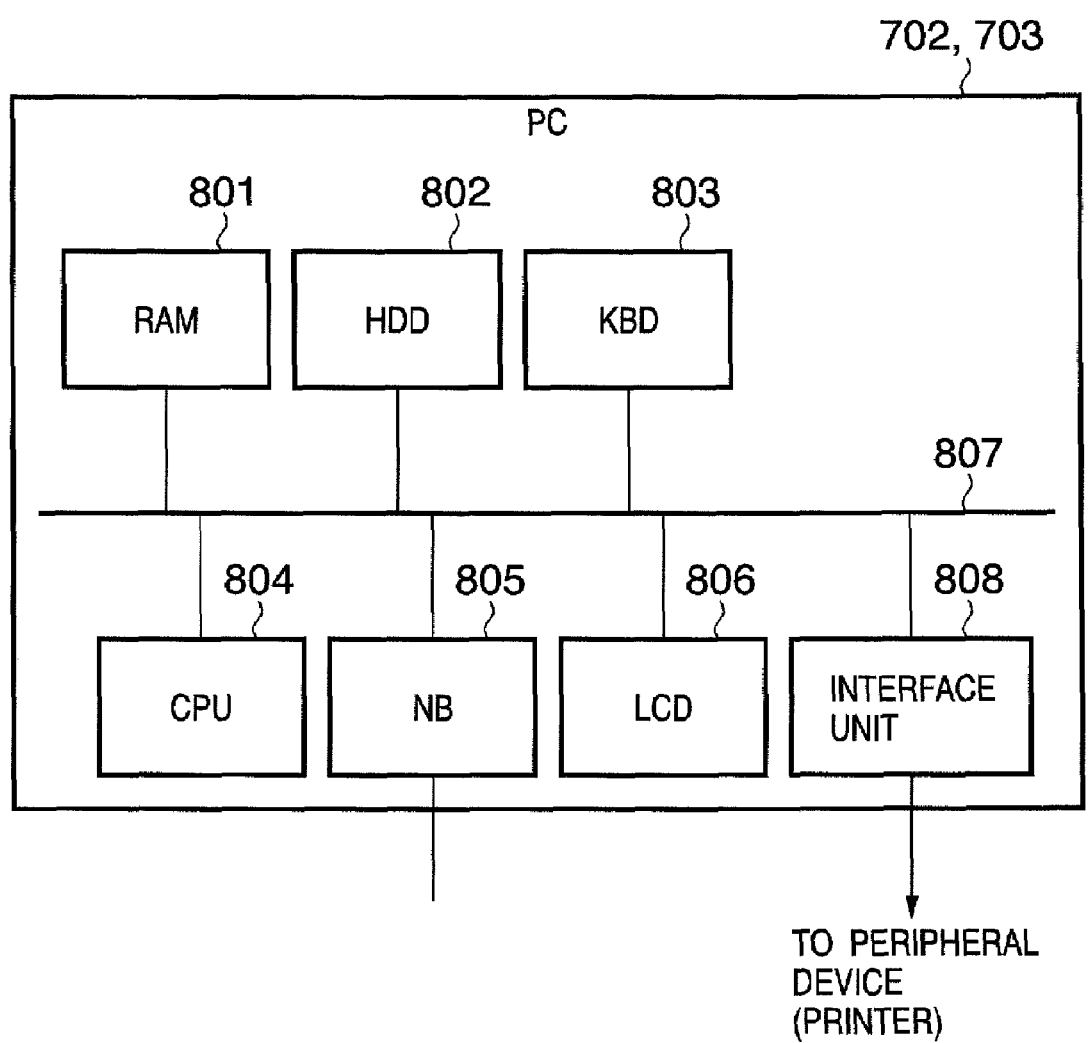
FIG. 3 is a block diagram for explaining a structure example of a personal computer (PC) as an information processing apparatus according to the present embodiment.

In FIG. 2A, the PC 703 is constituted of hardware such as that described in FIG. 3, and has Microsoft Windows® XP installed thereon as its operating system. Nos. 705 and 707 are printers, which are constituted of color inkjet printers, for example, and are peripheral apparatuses according to the present embodiment. The peripheral apparatus according to the embodiment may be an image forming apparatus, including but not limited to a printer, a copier, a fax machine, or a multi-function apparatus combining the functions thereof, or a scanner or a digital camera. The printers 705 and 707 are constituted of hardware such as that described in FIG. 4, and are connected via a USB interface 704 and 706 to the PC 703, and are both capable of bi-directional communication therewith. USB is an abbreviation for Universal Serial Bus, a commonly known interface capable of bi-directional communication. While the following description draws on an example of a USB interface as the communication interface of the PC 703, the communication interface is not limited thereto. For example, it would be permissible to apply wireless communication, as well as an interface including but not limited to a Centronics interface, or a LAN interface running over an Ethernet cable.

Referring to FIG. 2A, No. 605 is a Language Monitor (LM), which is a Windows® dynamic link library. Here, a detailed description will be given of the LM. The LM module has the following two functions. The LM functions as a status management unit. Specifically, the LM performs bi-directional communication with the printer, obtains the printer status, and stores and maintains the printer status in a predetermined location. It is possible for the status thus obtained and stored to be accessed in other software via the spooler. The LM has a function that transmits all types of data, including print job data to the printer, and also has a function including but not limited to adding a printer control command or other element to the data to be transmitted. No. 602 is an application. An example of the application 602 includes, but is not be limited to, a status monitor that displays the status of the printer 705 and the printer 707. Hereinafter, in the present embodiment, a description will be given of the status monitor as focus.

No. 603 is a registry, to which is allocated a specific storage area, and which is managed as a component of the operating system. The application 602 and the LM 605 are able to store arbitrary information in the registry 603, and query the arbitrary information therefrom as well. In particular, the various types of printer status are maintained in the registry 603, according to the present embodiment.

No. 604 is a Printing and Print Spooler Interfaces. The application 602 can send information to the LM 605 and receive information from the LM 605 by using the Printing and Print Spooler Interfaces 604.

Figure 2B:
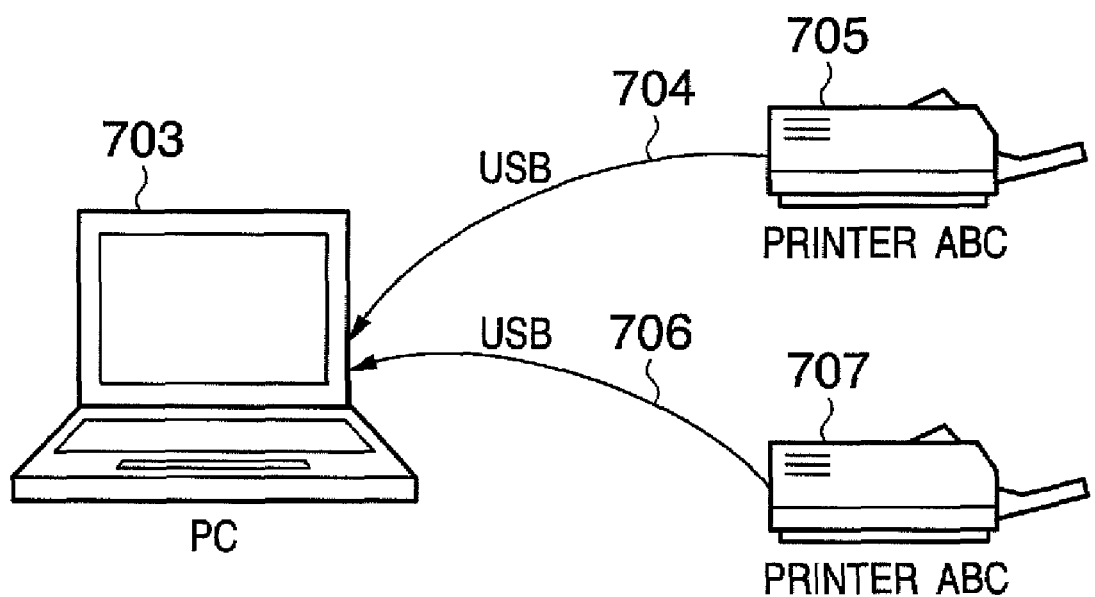
FIG. 2B is a view for explaining a printer pool function according to the embodiment.

FIG. 2B is a schematic view of a printer pool function according to the present embodiment. The printer pool function is a technology that manages a plurality of printers connected to a PC with a single queue. In FIG. 2B, two printers 705 and 707 are connected to the PC 703, and both printers are managed with a single queue.

<Example of PC Hardware Structure>

FIG. 3 is a block diagram of a PC hardware structure. In FIG. 3, the PC 702 and the PC 703 are controlled by a CPU 804 as a control unit for calculation control. The CPU 804 uses a random access memory unit, i.e., a RAM 801, as a temporary storage unit, and controls the PC in accordance with a program that is loaded into the RAM 801 from a storage unit (a hard disk drive (HDD) 802). A keyboard (KBD) 803, an example of an input unit, is used for either data input or direction of operation, and an LCD 806, an example of a display unit, is used to display data or give notification of status. A network board (NB) 805, an example of a communication control unit, performs communication over the network 701. An interface unit (I/F unit) 808 controls a connection between the PC and the peripheral apparatus, the printer in the present embodiment. A bus 807 connects the constituent elements of the PC to one another.

The RAM 801 maintains a storage area for a structure for port information managing, which is accessed by the spooler or the LM as depicted according to a first embodiment, as well as a port information structure storage unit, and a schema wherein the status monitor interacts with the LM via the spooler. The RAM 801 also maintains a storage area for a registry, as depicted according to a second embodiment. The RAM 801 also maintains a temporary storage area for such use as depicted hereinafter, i.e., an argument of an export function, a name of a port that is bred by each respective flow, or a status that the LM obtains from the printer. The HDD 802 as the storage unit, which may also be such as a portable CD-ROM, an internal ROM, or a memory card, stores image data to be printed or other large volume of data or a program that is used according to the present embodiment.

<Example of Printer Hardware Structure>

Figure 4:
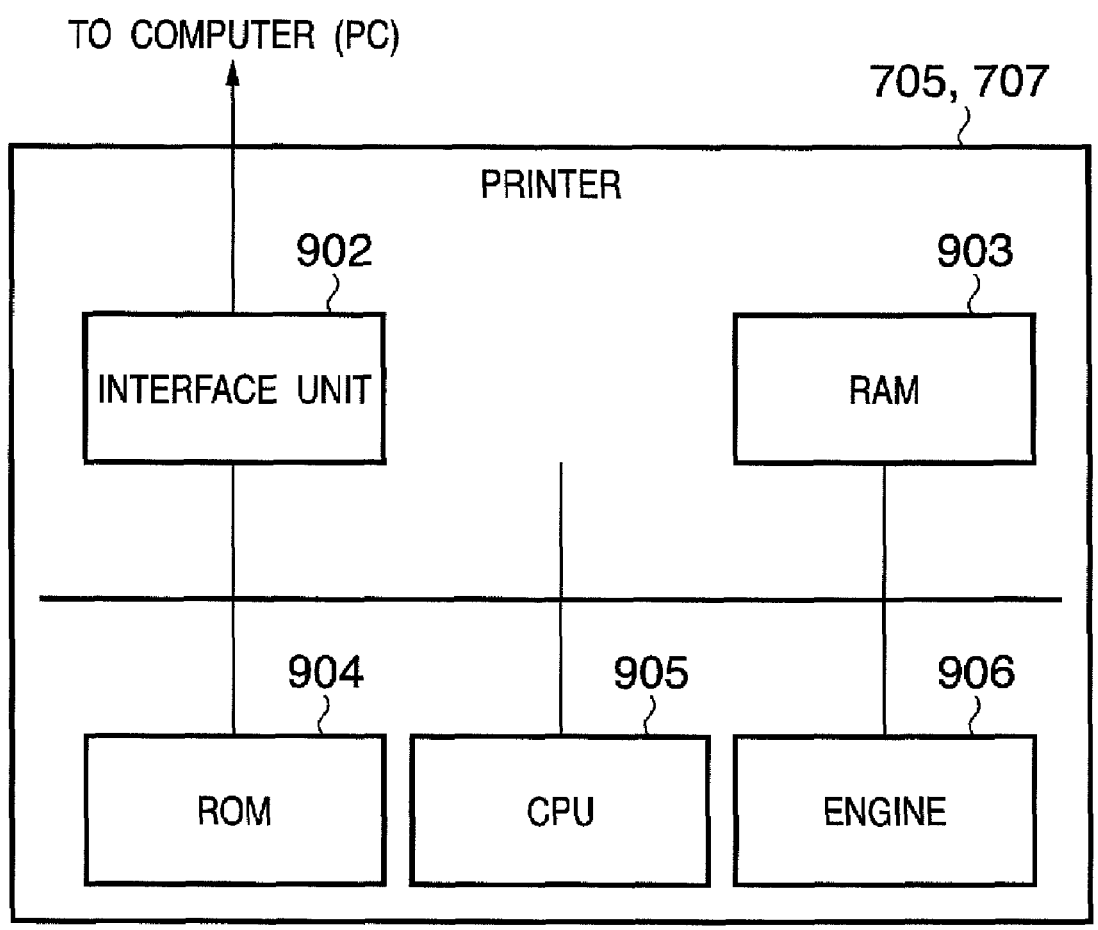
FIG. 4 is a block diagram for explaining a structure example of a printer as a peripheral apparatus according to the present embodiment.

FIG. 4 is a block diagram of a printer hardware structure. In FIG. 4, the printer 705 and the printer 707 includes an interface unit (I/F unit) 902, a RAM 903, a ROM 904, a CPU 905, and an engine 906.

The interface unit 902 connects to the USB interface (the interface unit 808) on the computer (PC). Either a wireless communication or wired communication bi-directional interface may be applied to the interface unit 902. It is also permissible to apply the interface unit 902 in a one-to-one configuration between the host and the printer, including but not limited to a Centronics interface, or in a LAN configuration, wherein the host and the printer are connected via Ethernet cable.

The ROM 904 stores a control program or other software. The CPU 905 controls all units of the printer, according to the control program stored in the ROM 904. The RAM 903 is used as main memory and a work memory for the CPU 905, and includes a reception buffer for temporarily storing data upon receipt. The engine 906 performs printing in accordance with the data that is stored in the RAM 903. It is permissible for the printer 705 and the printer 707 to include a hard disk drive or other apparatus for maintaining a large volume of image data. Whereas the description is performed using an inkjet method as an example of the engine 906 of the peripheral apparatus according to the present embodiment, the engine 906 is not limited thereto, with, for example, such engines (unit for recording to a medium) as an electrophotography method or a thermal transfer printer method being applicable as well.

<Operation Example of Peripheral Apparatus Control System According to the Present Embodiment>

Figure 5:
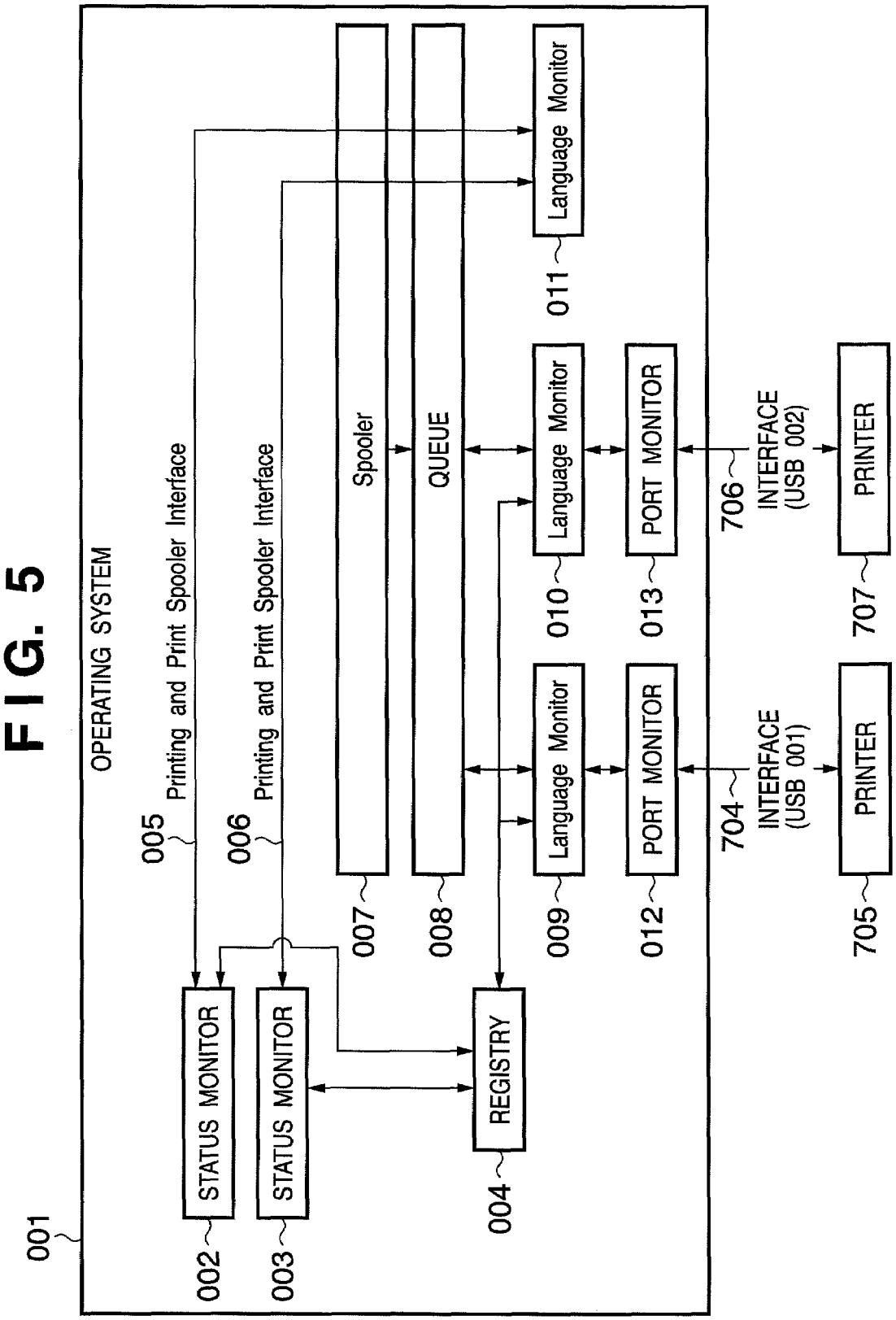
FIG. 5 is a block diagram of a software function example of a peripheral apparatus control system that includes an information processing apparatus and a peripheral apparatus according to the present embodiment.

FIG. 5 is a block diagram of a software function example of the peripheral apparatus control system that includes the information processing apparatus and the peripheral apparatus according to the present embodiment. While a printer program is not shown, as it is not a main element, as a process according to the present embodiment, such operation as returning of status in response to polling by the LM, or returning of status when printing ends, are related operations.

In FIG. 5, No. 001 is an example of the software structure of the PC 703. Here, only software pertaining to the present embodiment is depicted. Microsoft Windows® XP is installed thereon as its operating system.

Nos. 002 and 003 are applications such as the status monitor, which monitors the status of the peripheral apparatus. The status monitor 002 monitors, via the LM or other types of module, the status of the printer 705. The status monitor 003 monitors, via the LM or other types of module, the status of the printer 707. No. 004 is the registry that stores information on the operating system or the applications, a function that is provided within the Windows® XP framework. Information on a plurality of queues, and information on a port that is associated with each respective queue, is written to the registry 004; see FIG. 14 for particulars. Nos. 005 and 006 are the Printing and Print Spooler Interfaces and is provided within the Windows® XP framework. No. 007 is the spooler, a part of the Windows® XP operating system, which manages a queue 808, which, in turn, queues a print job. Here, a detailed description will be given of the queue. The queue is a module that manages printing data in accordance with a document creation software or other application data. It is possible to allocate a plurality of printers, or ports, to the queue. When performing a printing direction from the document creation software or other application, a printing data file is created in a specified location on the PC hard drive, the queue reads the file, and generates and displays a printing data list. The queue also transmits the printing data in sequence to the printer and performs printing. The queue is further capable of performing print data manipulation, including but not limited to pausing or deletion thereof.

Nos. 009, 010, and 011 are the language monitors, which, as a data communication interface, control the sending and receiving of data. Of the LM 009, 010, and 011, the LM 009 and 010 are called by the spooler 007 when the queue 008 transmits a print job to the printer. The LM 009 is called when the print job is sent to the printer 705. The LM 010 is called when the print job is sent to the printer 707. The LM 011 is called when the status monitor 002 and 003 use the Printing and Print Spooler Interfaces 005 and 006 to communicate with the LM. Whereas the LM 009, 010, and 011 are depicted as being isolated from one another in FIG. 5, it is permissible for the LM 009, 010, and 011 to be executed as the same LM.

Nos. 012 and 013 are a port monitor, which transmit data sent from the LM 009 and 010 to a USB port, and receive data sent from the printer 705 and 707. The port monitor is a module that writes printing data received from either the queue or the LM to the port, and reads printer status from the printer that is connected to the port. A sequence is in place on a per interface basis when performing writing to, or reading from a port, and the port monitor performs writing to, and reading from, a port according to the sequence. The port, created on a per interface basis, including but not limited to USB, depicts a location when data writing or reading is performed.

Nos. 704 and 706 are the Universal Serial Bus (USB), a commonly known interface capable of bi-directional communication. As a port number, USB 001 is allocated to the USB 704, and USB 002 is allocated to the USB 706. Nos. 705 and 707 are the color inkjet printers that are the peripheral apparatuses according to the present embodiment.

The printer 705 and the printer 707 are connected to the PC 703. The queue 008 printer pool function is on, and the printer 705 and the printer 707 are allocated thereto.

The status monitor 002 monitors the status of the printer 705, using the registry 004 to communicate with the LM 009, and the Printing and Print Spooler Interfaces 005 to communicate with the LM 011. The status monitor 003 monitors the status of the printer 707, using the registry 004 to communicate with the LM 010, and the Printing and Print Spooler Interfaces 006 to communicate with the LM 011. Here, the LM 011 is activated in order to perform a return in response to a query, using the Printing and Print Spooler Interfaces 006, into the printer status. The LM 009 and 010 monitor the status of the printer 705 and the printer 707, and set the status information to a port information structure that is managed by the registry 004 or the spooler 007 (the LM 011).

Figure 6:
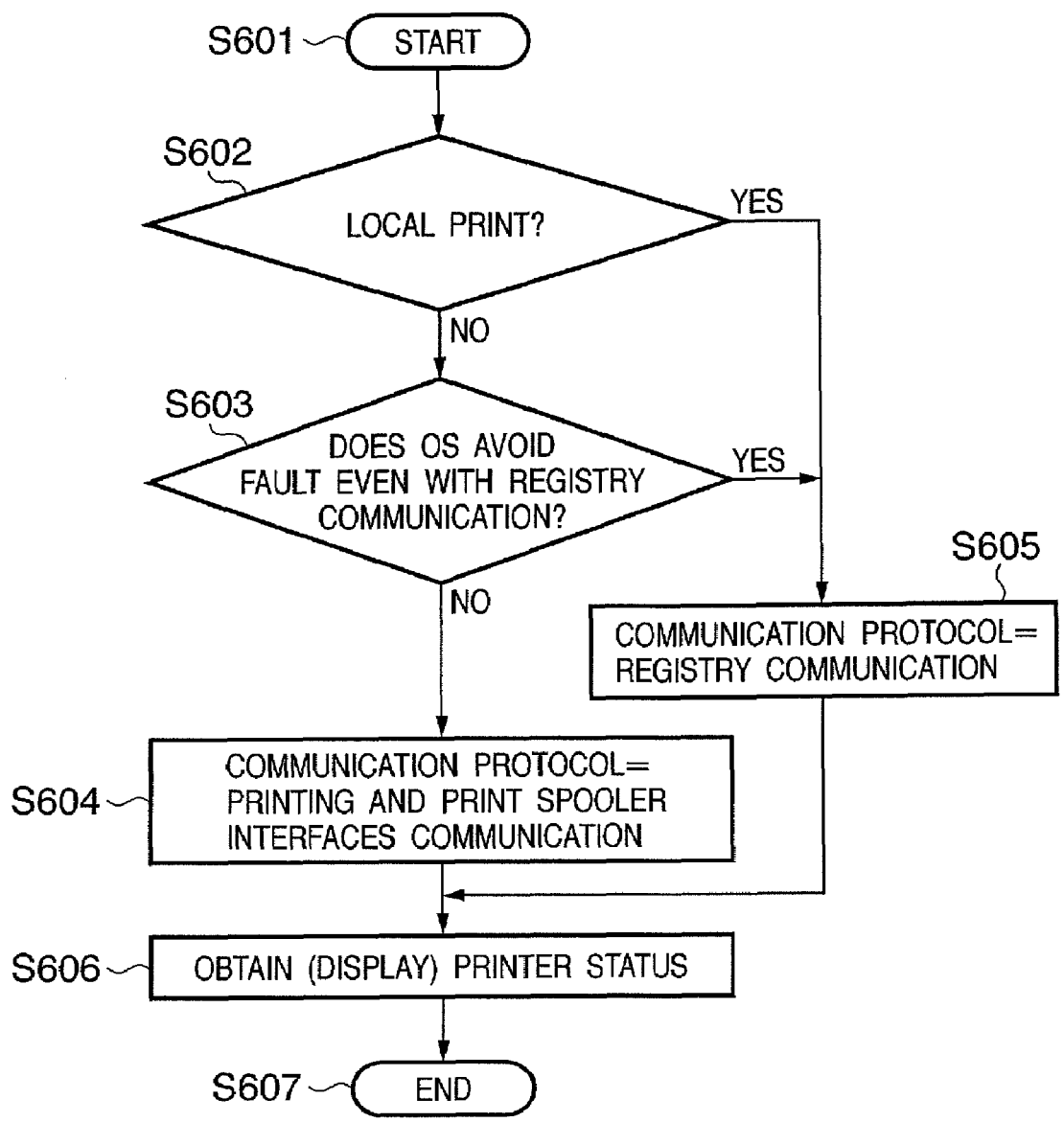
FIG. 6 is a flowchart showing an example of a process that determines which method a status monitor uses to perform communication with a LM, according to the present embodiment.

FIG. 6 is a flowchart showing an example of a process that determines a method that the status monitor uses to perform communication with the LM. More specifically, the flowchart depicts a process whereby the status monitor, which functions as a status query unit, switches between querying the LM, i.e., the status management unit, and obtaining the status that is written to the registry, i.e., the prepared storage area, on a per port basis. The process of recording the status on a per port basis to the registry, i.e., the prepared storage area, is described in detail in the second embodiment.

The status monitor commences the process of determining the communication method in step S601, by first determining whether the initial destination will be the PC 702 or the PC 703, and determines whether the current print is a local print or not, per step S602. For example, if the name of the PC 703 is included within the port name that is included within the print request, the status monitor that is launched by the PC 702 is determined to be "no" in FIG. 6, step S602. The local print is a print wherein the PC that issues the print job, such as that depicted in FIG. 5, is the same PC as that to which the printer is connected. For example, in FIG. 1, a print would be a local print if the PC 703 issues the print job. If the PC 702 issues the print job, it is determined that the print is a remote print, i.e., not local print, as the print is routed via the PC 703 to use one of the printers. The remote print is also known as a print using a shared printer.

If the current print is a local print, the registry 004 is used to communicate with the LM, per step S605. The process of step S605 is described in detail in the second embodiment. On the other hand, if the current print is not the local print, a determination is made in step S603 as to whether or not the operating system running on the current PC (the client) 702, and the PC (the server) 703 have problem (or difficulty) with performing registry communication. The determination of whether such the problem exists or not is made, for example, by a type of operating system that the print system is running, or other procedure. If no such the problem exists, the registry 004 is used to communicate with the LM, per step S605. If such the problem exists, the Printing and Print Spooler Interfaces 005 and 006 are used to communicate with the LM, per step S604. The Printing and Print Spooler Interfaces 005 and 006 may be used regardless of whether they are within a single PC, or distributed across different PCs.

Status is securely obtained on a per printer basis via step S604, and an operator is notified with a display, per step S606. Then the process ends at S607.

According to the present embodiment, the description involves performing the process in step S603, although the process in step S603 may be omitted as appropriate if not required. Also according to the present embodiment, the description of the condition for switching between querying the LM, i.e., the status management unit, and obtaining the status that is written to the registry, i.e., the prepared storage area, on a per port basis, cites steps S602 and S603 as an example, although the condition is not restricted thereto. It would be permissible, for example, to apply another predetermined condition.

FIG. 7 shows a queue when performing a print when the printer pool function is on. FIG. 7 shows a user interface displayed by the status monitor according to the process of the flowchart in FIG. 13. The name of a queue 101 is Printer ABC, and the printer 705 and the printer 707 are allocated thereto. A first job 102 is transmitted to the printer 705, which is connected to the USB 001 (704). A second job 103 is transmitted to the printer 707, which is connected to the USB 002 (706). Thus, it is possible to process a plurality of print jobs at once when the printer pool function is on.

<Operation Example of Status Monitor Process According to the First Embodiment>

According to the first embodiment, it is presumed that the Printing and Print Spooler Interfaces have been selected, by the process in FIG. 6, step S604, for communication with the LM. Whereas the first embodiment is constituted of the software described in FIG. 5, communication between the status monitor and the LM is executed using the Printing and Print Spooler Interfaces 005 and 006.

Port Information Management Structure Example

Figure 8:
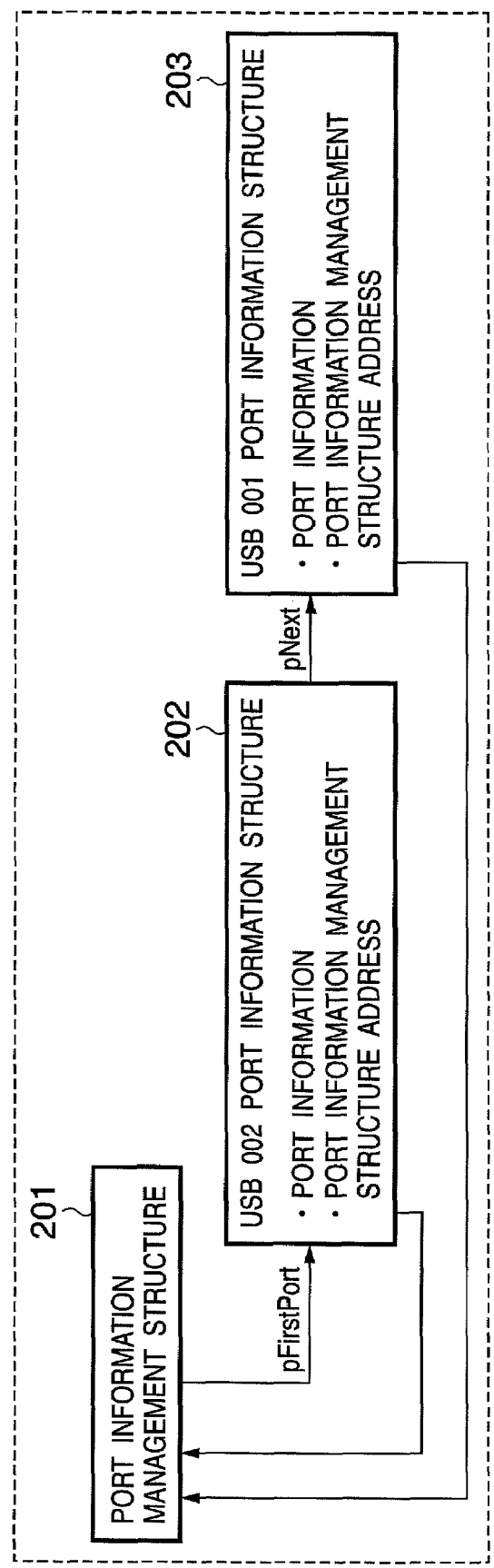
FIG. 8 shows a method whereby a LM manages port information, according a first embodiment.

FIG. 8 shows how the spooler 007 and the LM manage port information, and shows a maintenance unit that maintains status on a per port basis. The port information referenced hereinafter is managed by the spooler 007, while the LM 009 and 010 performs the creation and writing of the port information, and the LM 011 performs a return to a port information query from the status monitor. It is permissible for a storage location in FIG. 8 to be a storage location created by the LM, a storage location pre-defined and provided by the operating system, or a storage location shared by the LM and the operating system.

Nos. 202 and 203 are the port information structure, which store information on each respective port to which the printer is connected, and which are created by each and every LM on a per connected port basis whenever the spooler 007 calls an OpenPortEx( ) as export function of the LM 009 and 010. Each respective port information structure is created when the OpenPortEx( ), equivalent to a port initialization, is called from the spooler 007 in response to the LM 009 and 010, respectively, after the PC 703 is activated and the LM 009 and 010 are activated vis-à-vis each respective port. A no paper error or other status information that the LM 009 and 010 obtain from the printer that is connected to the port as shown in FIG. 5 is also stored in the port information structure. A port identifier, including but not limited to a port name, as per FIG. 11, is included in the port information. The status information on a per port basis shown in FIG. 8 is updated by the LM 009 and 010 obtaining the status information from the printer 705 and the printer 707, and updating the status information so obtained.

Management of the port information structure is performed using the port information management structure 201, which is created by the LM when the spooler 007 calls InitializePrintMonitor2( ), an LM export function. The port information management structure 201 is created when the InitializePrintMonitor2( ) for either of LM 009 and 010 is called from the spooler 007, after the PC 703 is activated and the LM 009 and 010 are activated.

A pointer to the first port information structure 202, which, in the present embodiment, is the port information structure of the USB 002 port, is stored in a member variable pFirstPort of the port information management structure. A pointer to the second port information structure 203, which, in the present embodiment, is the port information structure of the USB 001 port, is stored in a member variable pNext of the port information management structure. The address of the port information management structure is also stored in the port information structure, making it possible to examine the port information structure of every port by specifying the port information management structure from the port information structure. The OpenPortEx( ) and InitializePrintMonitor2( ) are established information that is published by MSDN.

<Example of Sequence of Creation of the Port Information Management Structure>

Hereinafter, a description will be given of an example of a sequence of creation of the port information management structure and the port information structure.

Figure 9:
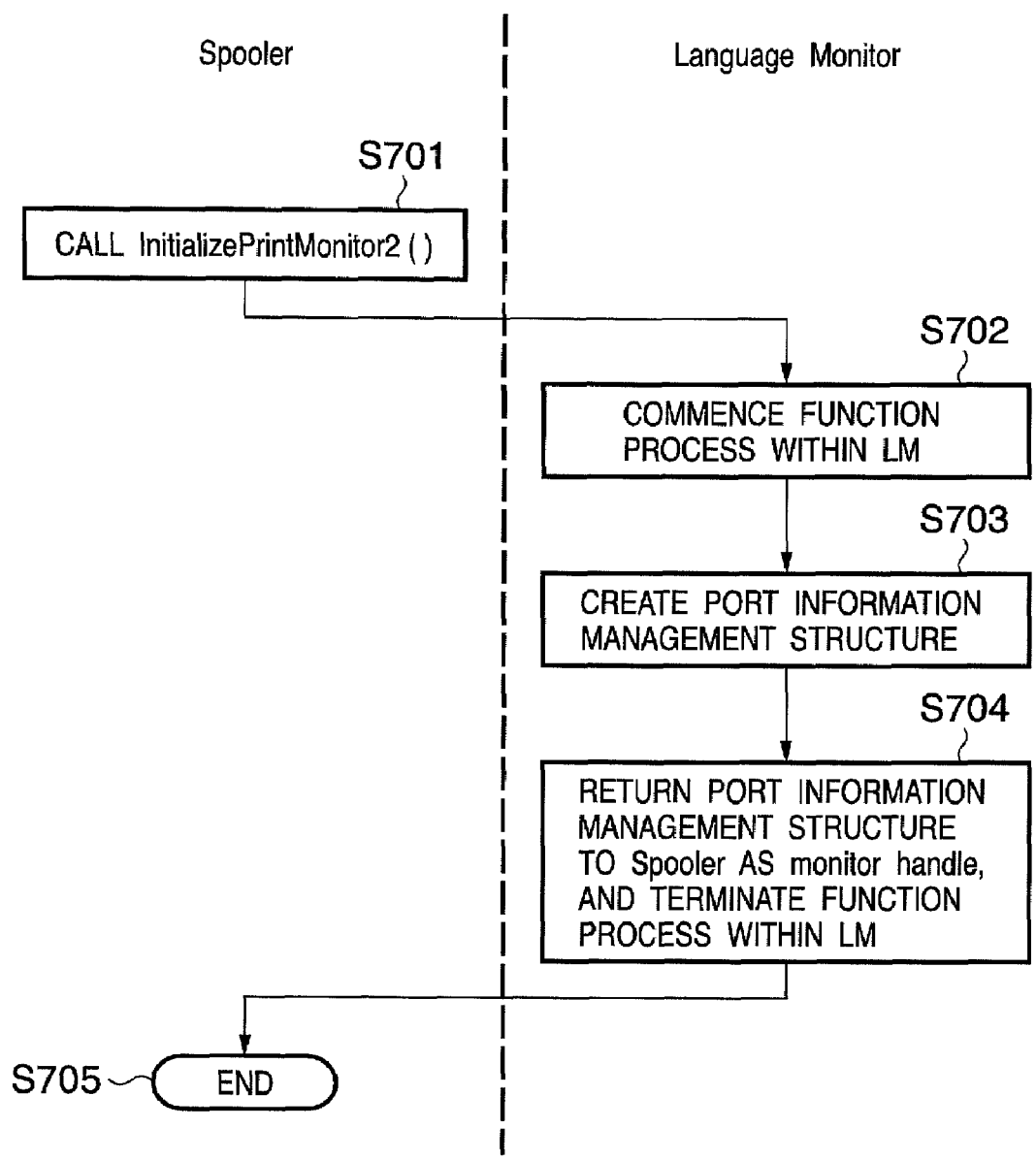
FIG. 9 is a flowchart showing a process whereby a LM creates a port information management structure, with an InitializePrintMonitor2( ), according to the first embodiment.

FIG. 9 is a flowchart showing an example of a process wherein either the LM 009 or 010 creates the port information management structure, with the export function InitializePrintMonitor2( ).

The spooler 007 (see FIG. 5) is directed by the operating system or the application to initialize the print monitor, and calls the InitializePrintMonitor2( ), the export function of either the LM 009 or 010, per step S701. The LM 009 or 010 commences processing of the InitializePrintMonitor2( ), i.e., function processing, per step S702. The LM creates the port information management structure 201, per step S703. A second argument of the InitializePrintMonitor2( ), phMonitor, is set to the created port information management structure 201, which is returned to the spooler 007 as a monitor handle, and the LM processing terminates, per step S704. That is to say, the port information management structure 201 is returned to the spooler 007 as a monitor handle, and the function processing within the LM terminates.

The spooler 007 receives the port information management structure 201 as a monitor handle, via the second argument of the InitializePrintMonitor2( ), and the InitializePrintMonitor2( ) function call terminates, per step S705.

<Example of Sequence of Creation of the Port Information Structure>

Figure 10:
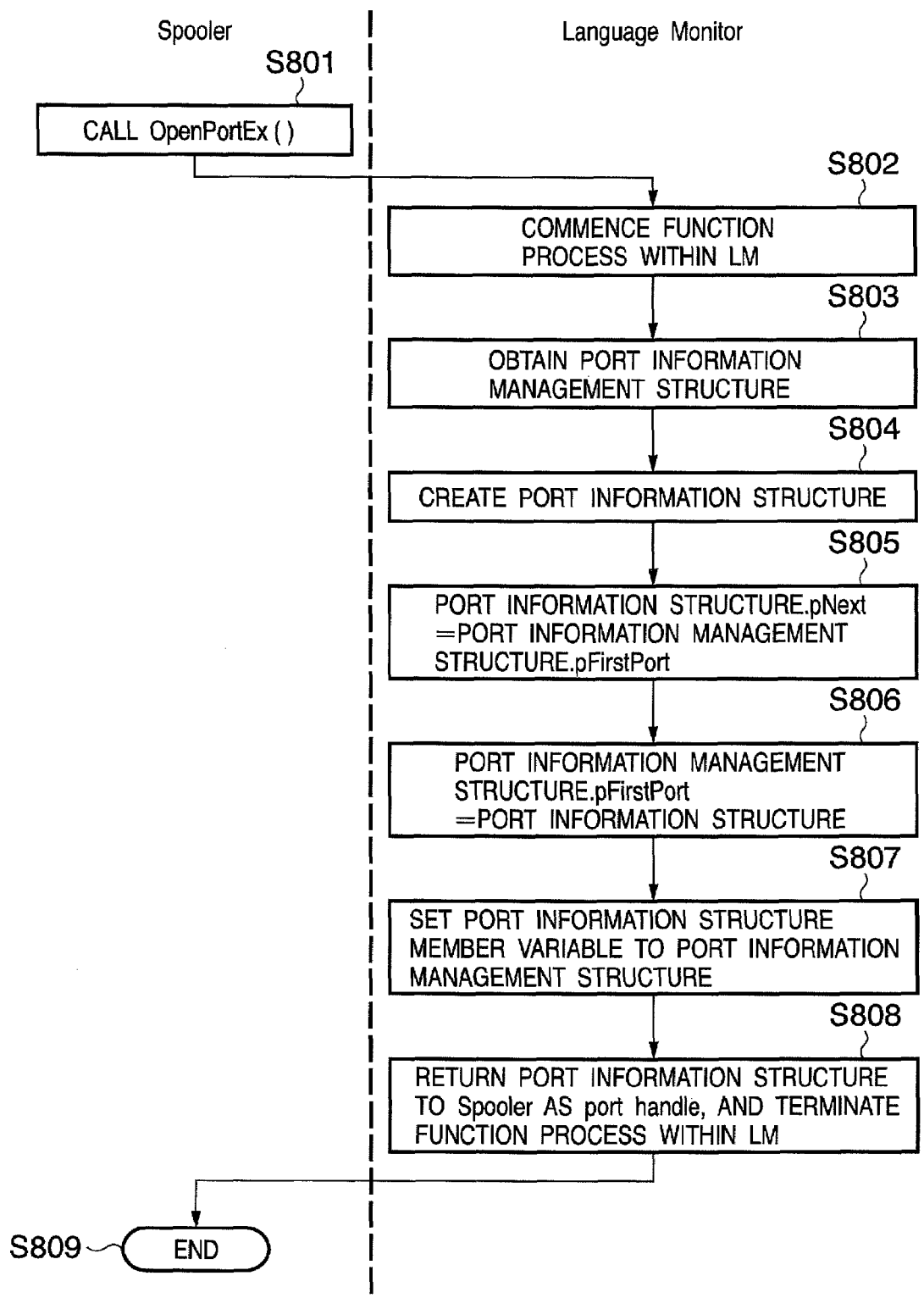
FIG. 10 is a flowchart showing a process whereby a LM creates a port information structure, with an OpenPortEx( ), according to the first embodiment.

FIG. 10 is a flowchart showing a process whereby the either the LM 009 or 010 creates either the port information structure 202 or 203, with an OpenPortEx( ) export function.

The spooler 007 is directed by the operating system or the application to initialize the port, and calls the OpenPortEx( ), the export function of either the LM 009 or 010, per step S801. The LM 009 or 010 commences processing of the OpenPort Ex( ), i.e., function processing, per step S802. The LM obtains the port information management structure 201, which is passed as a second argument of the OpenPortEx( ), per step S803. The port information management structure 201 is that created as shown in FIG. 9, S703. The LM creates either the port information structure 202 or 203, per step S804.

The created port information structure is then linked. For example, the port information structure 203 is already created as shown in FIG. 8, and the port information structure 202 is then created. In this case, in step S805, the LM 009 stores the address of the port information structure 203, that is designated in the member variable pFirstPort of the port information management structure 201, in the member variable pNext of the port information structure 202, which is created anew in step S804. In step S806, the address of the port information structure 202, which is created anew in step S804, is stored in the member variable pFirstPort of the port information management structure 201. In step S807, the member variable of the port information structure 202 is set to the address of the port information management structure 201. In step S808, the port information structure 202 is set to the fifth argument pHandle of the OpenPortEx( ), returned to the spooler 007 as the port handle, and LM process, i.e., the function process, terminates. The spooler 007 receives the port information structure as a port handle, via the fifth argument of the OpenPortEx( ), and the OpenPortEx( ) function call terminates, per step S809.

<Example of Communication Structure of Printer Status Information>

FIG. 11 shows a schema used when the status monitor and the LM 011 use to perform communication concerning printer status information, using the Printing and Print Spooler Interfaces 005 and 006. The schema is coded using a markup language such as XML. The schema is created by the status monitor when the status monitor and the LM 011 perform communication. Whereas "schema" typically means an overall database structure or a file describing the overall database structure, in the present embodiment, "schema" is taken to mean a display method or format that displays the status of the peripheral apparatus.

A definition name is "Status," a NodeType is "Value," a full path of the schema is "¥Printer Information.<PortName>: Status," and a Data Type is binary format. The port identifier of the port to which the printer is connected is found in <PortName>. According to the first embodiment, the port name is used as the port identifier. For example, when obtaining information on the status of the printer connected to the USB 001, the full path of the schema is "¥Printer.Information.USB 001:Status". The printer status information 1101 is stored in binary format.

FIG. 12 is an example of the status information 1101 that is stored in binary format. In FIG. 12, such information as a printer apparatus ID, warning information such as ink running low, an error such as a no paper error, remaining ink strata, information on a page currently being printed, and information on a page that has been printed, are stored as the status information 1101, although the status information 1101 is not restricted thereto.

<Example of Sequence of Communication of Printer Status Information>

Figure 13:
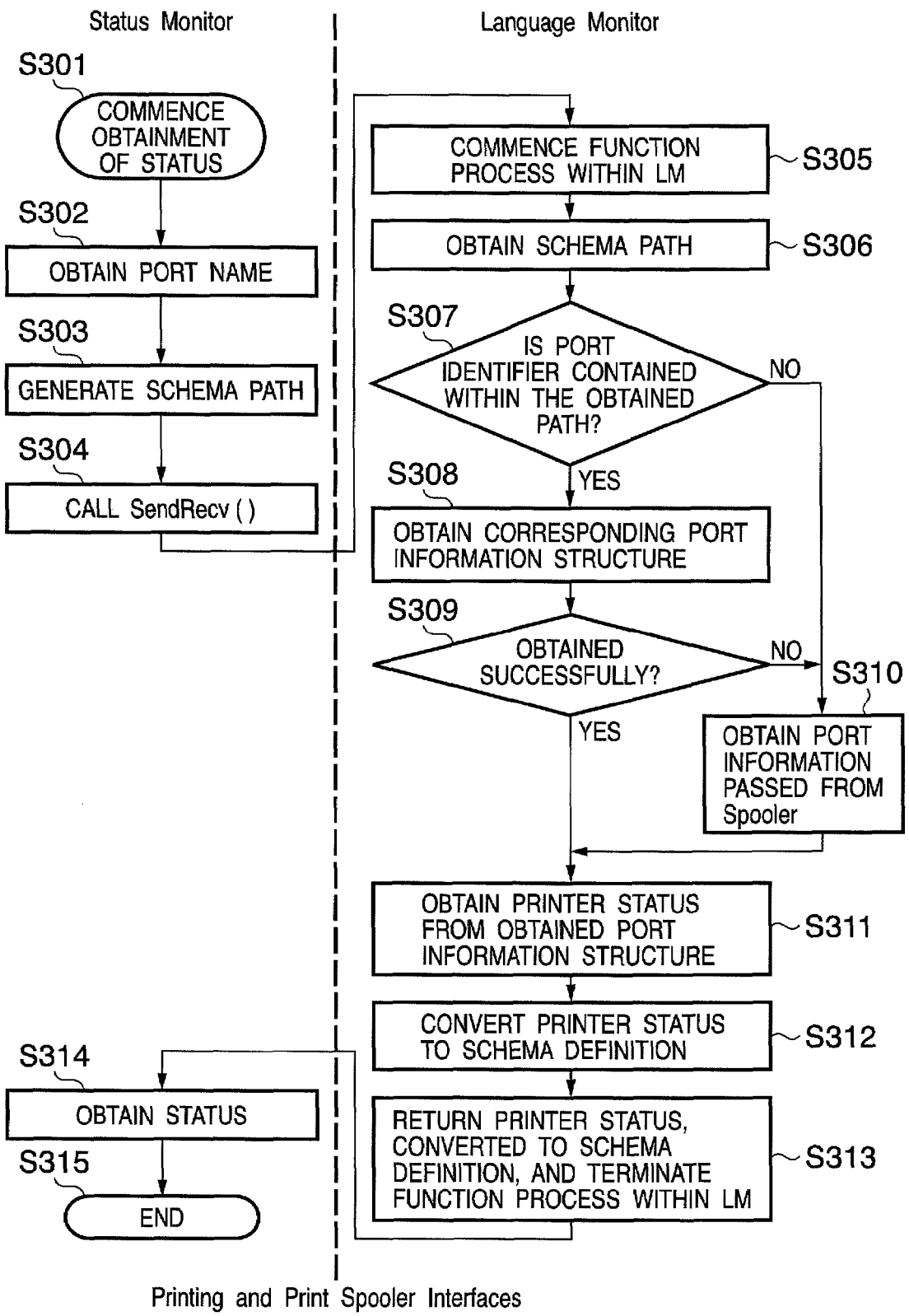
FIG. 13 is a flowchart showing a process sequence example wherein a status monitor and a LM use a spooler interface to perform communication, and display a status of a plurality of peripheral apparatuses that is allocated to a queue.

FIG. 13 is a flowchart showing a process wherein the status monitor uses the Printing and Print Spooler Interfaces to obtain the printer status information.

In FIG. 13, the status monitor commences a process of obtaining the printer status, according to a print job, an operator query, or other request from the application or the operating system, per step S301. If a plurality of peripheral apparatuses, or ports, are allocated to a single queue, that is, if the printer pool is being executed, the port name of the printer is obtained, in accordance with the print job, the operator query, or other request, per step S302. If, on the other hand, the printer pool has not been designated, the port obtainment in step S302 is not performed, and a schema is published to the LM that does not contain the port identifier. In this case, step S307 is determined to be "no" (discussed later). Based on the port name so obtained, a path for a schema used with the Printing and Print Spooler Interfaces 005 and 006 is created in step S303. IbidiSpl::SendRecv( ), a function of the Printing and Print Spooler Interfaces is called as an argument of the schema so created, in step S304. SendRecvBidiDataFromPort( ), an export function of the LM 011, is called by the spooler 007, in step S305, in accordance with the Send Recv( ) call. In other words, the LM internal function process commences.

The schema and the port information structure that correspond to the port that the status monitor created in step S303 are passed from the spooler 007 to the LM 011 as arguments of the SendRecvBidiDataFromPort( ). When the spooler 007 calls the OpenPort( ) export function of either the LM 009 or the LM 010, the port information structure is that created by either the LM 009 or the LM 010.

Whereas there are two ports, the USB 001 and the USB 002, that are allocated to the queue 008, there is only one port information structure that is passed to the queue 008. Whereas, when the status monitor designates the port identifier for the schema, the designated port information structure is passed to the queue 008, the question of which port's port information structure is to be passed to the queue 008 when the port identifier is not designated is dependent upon the specifications of the spooler.

The schema that is passed as the argument of the Send RecvBidiDataFromPort( ) is obtained in step S306, and a check is made in step S307 as to whether or not the schema contains the port identifier. If the schema does contain the port identifier, the port information structure is obtained, in step S308, whose port identifier matches the port identifier from the port information structure that is managed via the method described in FIG. 8. Specifically, port information to be viewed is specified by matching the port identifier contained within the port information in FIG. 8, and the port identifier contained within the schema, i.e., <PortName>, in FIG. 11. The status that is maintained within the port information so specified is read out and returned to the origin of the status request.

If the port information structure is successfully obtained, per step S309, the process proceeds to step S311. If the port identifier is not present, per step S309, the port information structure that was passed from the spooler 007, that is, the status of the pre-defined port that is conventionally known, is obtained in step S310, and the process proceeds to step S311.

The printer status that is saved within the obtained port information structure is itself obtained, per step S311, and the status so obtained is converted to the definition of the schema, per step S312. The printer status that is converted to the definition of the schema is returned to the status monitor, via the spooler 007, as an argument of the SendRecvBidiData-FromPort( ) function. The process of the SendRecvBidiData-FromPort( ) function thus terminates, per step S313.

The status monitor obtains the status, per step S314, displays the status if necessary, and terminates the printer status obtainment process, per step S315.

<Operation Example of Status Monitor Process According to Second Embodiment>

An aspect of the second embodiment includes the software described in FIG. 5. According to the second embodiment, communication between the status monitor and the LM are presumed to be routed via the registry 004, as per the process shown in FIG. 6, step S605.

The reason for using the registry 004 for communication between the status monitor and the LM is as follows: with the operating system such as Windows® XP or Windows® 2000, a specified location is allocated within the registry on a per queue basis, and an API is offered for access thereto, including but not restricted to GetPrinterDataEx( ) or SetPrinterDataEx( ). In other words, use of the registry is a communication method that is recommended by the operating system, and, accordingly, has an advantage of the following sort. Even if the specification of the operating system is changed in future, using the recommended communication method allows the operating system to absorb a difference in the specifications, as well as allowing another module or an application to use the API to query the information written in the registry with ease.

FIG. 14 shows at which hierarchy a printer status storage location is recorded within the registry 004. A key is created on a per queue basis at the hierarchy of "HKEY_LOCAL_MACHINE¥SYSTEM¥CurrentControl Set¥Control¥Pr int¥Printers". In the present embodiment, a key "Printer ABC" is created for the queue 008. "PrinterDriverData" is created on a lower hierarchy of the "Printer ABC", and a key "USB 001" and a key "USB 002" are created in a lower hierarchy still, on a per port basis. If another queue is present, for example, a queue corresponding to a "Printer EDF", information regarding the "Printer EDF" is recorded in FIG. 14 in parallel to the information regarding the "Printer ABC".

Either the LM 009 or the LM 010 record printer status on a per port basis. The status of the printer 705, which is connected to the USB 001, is recorded in the "USB 001" hierarchy. The status of the printer 707, which is connected to the USB 002, is recorded in the "USB 002" hierarchy.

FIG. 15 shows an example of the printer status information that is recorded within the registry 004. A name "Printer_Status_Cartridge" is information on a cartridge that is loaded into the printer, with a value type of a string "REG_SZ", and a content of a string "Color". The information reveals that a color cartridge is loaded into the printer.

A name "Printer_Status_Error" is information on an error that has occurred within the printer, with a value type of a string "REG_SZ", and a content of a string "No". The information reveals that no error has occurred within the printer.

A name "Printer_Status_Warning" is information on a warning that has occurred within the printer, with a value type of a DWORD value "REG_DWORD", and a content of "500". The information reveals that a warning of warning code 500 has occurred within the printer.

A name "Printer_Status_Ink_Color" is information on an amount of color ink remaining within the printer, with a value type of a DWORD value "REG_DWORD", and a content of "70". The information reveals that the amount of color ink remaining within the printer is 70.

It is further noted that printer status information is not restricted to the above examples, rather the aforementioned examples are merely exemplary in nature and are not intended to limit the present invention.

<Example of Sequence of Obtainment of Status by the Status Monitor>

Figure 16:
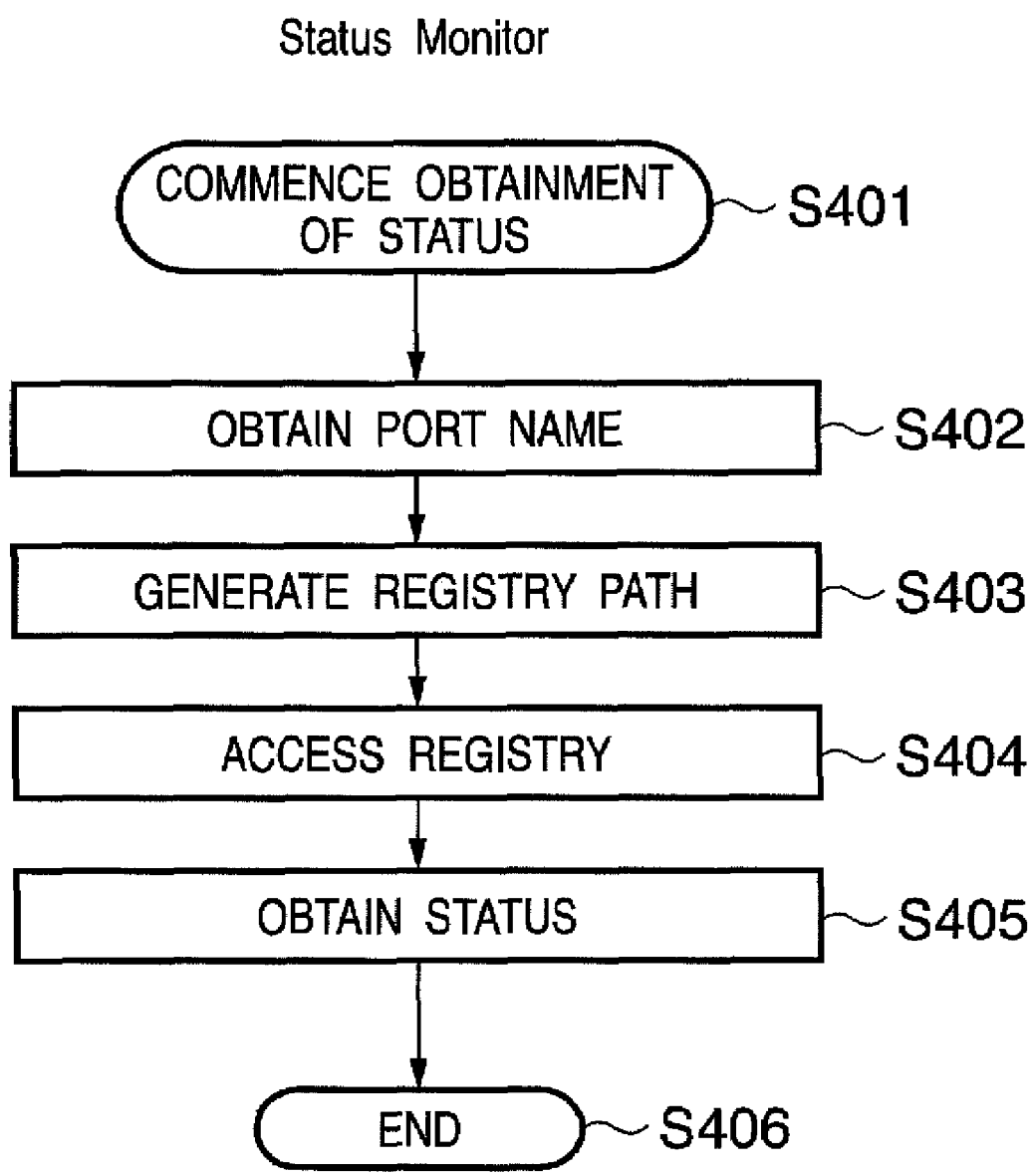
FIG. 16 is a flowchart showing a process sequence example wherein a status monitor obtains a printer status that is stored within a registry, according to second embodiment.

FIG. 16 is a flowchart showing a method wherein the status monitor uses the registry 004 to obtain the status of the printer. The status monitor commences a process of obtainment of the printer status, according to a print job, an operator query, or other request from the application or the operating system, per step S401. In step S402, the port name of the printer is obtained, in accordance with the print job, the operator query, or other request. In step S403, a path is created that designates the registry hierarchy, based on the obtained port name. For example, when obtaining the status of the printer 705, that is connected to the USB 001, the path would be as follows: "HKEY_LOCAL_MACHINE¥SYSTEM¥CurrentControl Set¥Control¥Pr int¥Printers¥Printer ABC¥PrinterDriver Data¥USB001".

After designating the created path, the status monitor then accesses the registry 004 per step S404, obtains the status per step S405, and then the process ends. It is noted that the path, for example, includes a queue designation and a port designation.

<Example of Sequence of Storing Status Within Registry>

Figure 17:
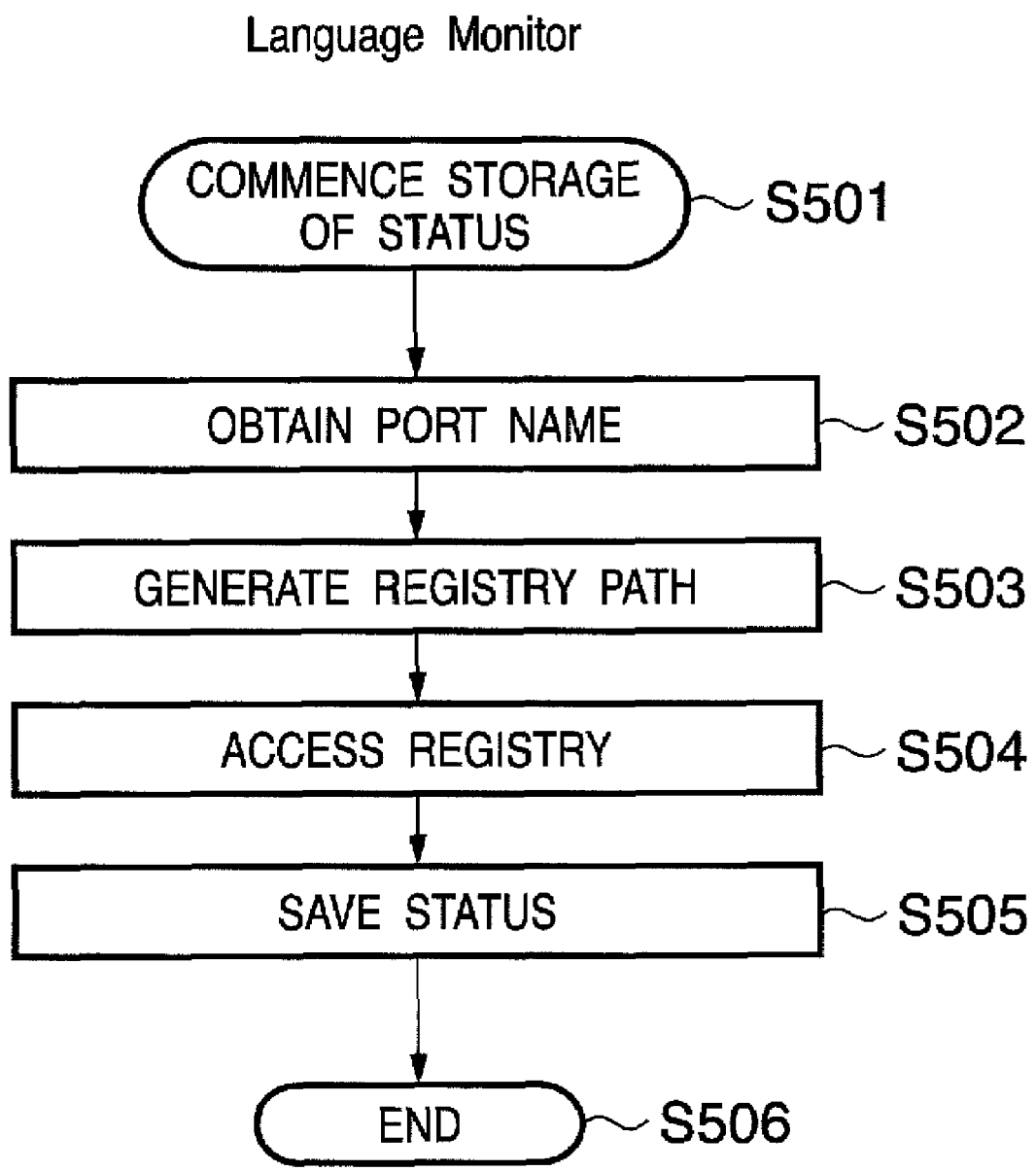
FIG. 17 is a flowchart showing a process sequence example wherein a LM stores an obtained printer status in a registry, according to second embodiment.

FIG. 17 is a flowchart showing a method whereby either the LM 009 or the LM 010 stores the printer status in the registry 004. Either the LM 009 or the LM 010 commences a storage process of status, periodically, for example, once every four seconds, whether by polling, termination of a printing process, or the like, per step S501. The port name of the printer whose status is saved in the registry 004 is obtained, whether by polling or event information from the printer, per step S502. In step S503, a path is created that designates the registry 004 hierarchy, based on the obtained port name. For example, when saving the status of the printer 705, that is connected to the USB 001, the path would be as follows: "HKEY_LOCAL_MACHINE¥SYSTEM¥CurrentControl Set¥Control¥Print¥Printers¥PrinterABC¥PrinterDriver Data¥USB001".

Using the created path, the registry 004 is accessed, per step S504, the status obtained from the printer saved, per step S505, and the status storage process terminated, per step S506.

According to the present invention, it is possible to provide a peripheral apparatus control method, and an information processing apparatus and control method, that correctly manages and displays the status of each individual peripheral apparatus, even when the plurality of peripheral apparatuses are allocated to the queue.

Other Embodiments

While the status monitor 002 and 003 are cited as an example of an application according to the above embodiments, the application is not limited thereto. For example, fulfillment would be possible with an arbitrary application that obtains information from a peripheral apparatus, and displays the information, and the present invention would be valid therewith as well.

Whereas a PC has been cited as an example of an information processing apparatus according to the above embodiments, the information processing apparatus is not limited thereto. For example, the embodiments may also be fulfilled, and the present invention is similarly valid, with an arbitrary terminal that is capable of using similar methods, including but not limited to a DVD video player, an electronic game machine, a set-top box, or an Internet appliance.

While a printer has been cited as an example of a peripheral apparatus according to the above embodiments, a different peripheral apparatus, including but not limited to a copier, a fax machine, or a multi-function apparatus that may comprise functions including but not limited to the functions of a printer, a scanner, or a fax machine may serve as a peripheral apparatus for the purpose of the present application.

While Windows® XP and Windows® 2000 are used as examples of an operating system according to the above embodiments, the present invention is not limited to these operating systems, and any arbitrary operating system may be used.

While a USB interface is used as an interface between the PC 703 and the printer 705 and the printer 707 according to the above embodiments, the present invention is not limited thereto. For example, an arbitrary interface, including but not limited to Ethernet, Wi-Fi, IEEE 1394, Bluetooth, IrDA, a parallel interface, or a serial interface may also be used.

While a format has been depicted according to the above embodiments wherein the LM and the port monitor are installed separately, fulfillment would also be possible with the function of the LM being contained within the port monitor, and the present invention would be valid under such circumstance as well.

The objective of the present invention is to supply a storage medium that records software program code that fulfills the embodiments to a system or apparatus. It goes without saying that the objective may also be achieved by a computer, or CPU or MPU, of the system or apparatus reading out and executing program code that is stored on the storage medium. In such circumstance, the program code itself that is read out from the storage medium would fulfill the functions of the embodiments, and the program code itself, and the storage medium that stores the program code, will constitute the present invention.

Possible storage media that might be used for supplying the program code would include, but are not limited to, for example, a floppy disk, a hard drive, an optical disk, a magneto-optical disk, a CD-ROM, a CD-R, a magnetic tape, a non-volatile memory card, or a ROM.

The functions of the embodiments are not only fulfilled by a computer reading out and executing the program code. It goes without saying that a circumstance is included wherein the functions of first embodiment or second embodiment are fulfilled by processing that is actually performed, in whole or in part, by an operating system or other software running on a computer, in accordance with the direction of the program code.

The program code that is read out from the storage medium is written to a memory that is either built into an expansion board installed in a computer or an expansion unit connected to the computer. It goes without saying that a circumstance is included wherein the functions of the are fulfilled by processing that is actually performed, in whole or in part, by a CPU or the like that is either built into the expansion board installed in the computer or the expansion unit connected to the computer, in accordance with the direction of the program code.

According to the present embodiment, it is possible to correctly manage and display the status of each individual peripheral apparatus, even when a plurality of peripheral apparatuses is allocated to a single queue.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese application No. 2006-077711 filed on Feb. 20, 2006, which is hereby incorporated by reference herein in its entirely.

What is claimed:

1. An information processing apparatus that runs an operating system, wherein the information processing apparatus allocates a plurality of peripheral apparatuses to a single queue that manages each of the plurality of peripheral apparatuses, the information processing apparatus comprising:

a status management unit that performs communication with the plurality of peripheral apparatuses, obtains the status of each respective peripheral apparatus on the basis of each individual port of a plurality of ports connected to the single queue, and stores the statuses in a storage area prepared for each individual port in a status storage unit;

a status query unit that queries the status management unit via a spooler of the operating system for the status of one of the plurality of peripheral apparatuses;

a port identifier recognition unit that recognizes a port identifier that is contained within a status query message that is issued by the status query unit, and identifies a port to which the peripheral apparatus is connected; and a status reply unit that reads out the status of the one of the plurality of peripheral apparatuses, which is connected to a port that corresponds to the port identifier recognized by the port identifier recognition unit, from the status storage unit, and replies the read status to the status query unit.

2. The information processing apparatus according to claim 1, further comprising a port identifier determination unit that determines whether or not the port identifier that identifies the port to which the peripheral apparatus is connected is contained within the status query message, wherein the status reply unit replies a status of a predetermined port, if the port identifier determination unit determines that the port identifier, contained in the status query message, is not contained therein.

3. The information processing apparatus according to claim 1, wherein the status management unit records the status of each peripheral apparatus in the prepared storage area on a per port basis, and the status query unit selects any one of status acquisition methods including a query to the status management unit and an obtainment of the status written to the prepared storage area on the per port basis according to a predetermined condition.

4. The information processing apparatus according to claim 1, wherein the status query unit includes the port identifier of the port to which the one of the plurality of peripheral apparatuses is connected in the status query message, when the plurality of peripheral apparatuses is allocated to the single queue.

5. An information processing apparatus that runs an operating system, wherein the information processing apparatus writes, to a registry which is allocated on a per queue basis by the operating system, a status that is obtained from each one of a plurality of peripheral apparatuses, and allocates the plurality of peripheral apparatuses to a single queue that manages the plurality of peripheral apparatuses, the information processing apparatus comprising:

a status management unit that communicates with any one of the peripheral apparatuses matches the status of each respective peripheral apparatus with a respective port identifier that corresponds to a respective one of the plurality of peripheral apparatuses, and records each respective status on a per port basis in a storage area prepared in a layer hierarchically under a storage area corresponding to the queue within the registry; and a status obtainment unit that designates the respective port identifier of each respective status of each respective peripheral apparatus, access the registry, and read out the statuses.

6. A peripheral apparatus control method for an information processing apparatus which runs an operating system, wherein the information processing apparatus allocates a plurality of peripheral apparatuses to a single queue that manages the plurality of peripheral apparatuses, the method comprising:

obtaining a status of each respective peripheral apparatus on the basis of each individual port of a plurality of ports connected to the single queue, and storing the statuses in a storage area prepared for each individual port in a status storage unit;

querying the status of each of the peripheral apparatuses via a spooler of the operating system;

recognizing a port identifier that is contained within an issued status query message which identifies each respective port to which the peripheral apparatuses are connected; and reading out the status of each respective peripheral apparatus, which is connected to the respective port that corresponds to the recognized port identifier, and replying the status.

7. The peripheral apparatus control method according to claim 6, further comprising determining whether or not each respective port identifier that identifies the respective port to which a respective peripheral apparatus is connected is contained within the status query message, wherein the status of a predetermined port is replied if it is determined that the respective port identifier is not contained therein.

8. The peripheral apparatus control method according to claim 6, wherein a status of the respective peripheral apparatus is recorded in the prepared storage area on a per port basis, and the query of the status is replaced with the obtainment of the status written to the storage area on the per port basis, according to a predetermined condition.

9. The peripheral apparatus control method according to claim 6, wherein the status query includes the respective port identifier of the respective port to which a respective peripheral apparatus is connected in communication when the plurality of peripheral apparatuses are allocated to the single queue.

10. A peripheral apparatus control method for an information processing apparatus that runs an operating system, wherein the information processing apparatus writes, to a registry which is allocated a per queue basis by the operating system, a respective status that is obtained from each of a plurality of peripheral apparatuses, and allocates the plurality peripheral apparatuses to a single queue that manages the plurality of peripheral apparatuses, the method comprising:

matching the status of each of the plurality of peripheral apparatuses with a respective port identifier, and recording the status on a per port basis in a storage area prepared in a layer hierarchically under a storage area corresponding to the queue within the registry; and obtaining the status of each of the plurality of peripheral apparatuses for designating the respective port identifier of the status of each of the peripheral apparatuses, accessing the registry, and reading out the statuses.

11. A computer readable medium containing computer-executable instructions for controlling an information processing apparatus which runs an operating system, wherein the information processing apparatus allocates a plurality of peripheral apparatuses to a single queue that manages the plurality of peripheral apparatuses, the medium comprising:

computer-executable instructions for obtaining a status of each respective peripheral apparatus on the basis of each respective individual port of a plurality of ports connected to the single queue, and storing the statuses in a storage area prepared for each individual port in a status storage unit;

computer-executable instructions for querying the status of each of the peripheral apparatuses via a spooler of the operating system;

computer-executable instructions for recognizing a port identifier that is contained within an issued status query message which identifies each respective port to which the peripheral apparatuses are connected; and computer-executable instructions for reading out the status of each respective peripheral apparatus, which is connected to the respective port that corresponds to the recognized port identifier, and replying the status.

12. A computer readable medium containing computer-executable instructions for controlling an information processing apparatus that runs an operating system, wherein the information processing apparatus writes, to a registry which is allocated a per queue basis by the operating system, a respective status that is obtained from each of a plurality of peripheral apparatuses, and allocates the plurality peripheral apparatuses to a single queue that manages the plurality of peripheral apparatuses, the medium comprising:

computer-executable instructions for matching the status of each of the plurality of peripheral apparatuses with a respective port identifier, and recording the status on a per port basis in a storage area prepared in a layer hierarchically under a storage area corresponding to the queue within the registry; and computer-executable instructions for obtaining the status of each of the plurality of peripheral apparatuses for designating the respective port identifier of the status of each of the peripheral apparatuses, accessing the registry, and reading out the statuses.

* * * * *